United States Patent
Kernkamp et al.

(10) Patent No.: US 6,397,612 B1
(45) Date of Patent: Jun. 4, 2002

(54) ENERGY SAVING DEVICE FOR WALK-IN REFRIGERATORS AND FREEZERS

(75) Inventors: John H. Kernkamp, Citrus Hts.; E. E. Linder; Ed Kersten, both of Watsonville, all of CA (US)

(73) Assignee: Energy Control Equipment, Freedom, CA (US)

( * ) Notice: Subject to any disclaimer, the term of this patent is extended or adjusted under 35 U.S.C. 154(b) by 0 days.

(21) Appl. No.: 09/778,612

(22) Filed: Feb. 6, 2001

(51) Int. Cl.⁷ .............................................. F25D 17/06
(52) U.S. Cl. ......................................... 62/186; 62/180
(58) Field of Search ........................ 62/186, 179, 180, 62/181, 183, 184; 236/DIG. 9, 49.3, 35, 38; 165/299

(56) References Cited

U.S. PATENT DOCUMENTS

| | | | | |
|---|---|---|---|---|
| 3,877,243 A | * | 4/1975 | Kramer | ........................ 62/180 |
| 3,959,979 A | * | 6/1976 | Kramer | ........................ 62/186 |
| 4,167,966 A | * | 9/1979 | Freeman | .................... 62/180 X |
| 5,488,835 A | | 2/1996 | Howenstine et al. | .......... 62/186 |
| 5,797,276 A | | 8/1998 | Howenstine et al. | .......... 62/186 |

* cited by examiner

Primary Examiner—Harry B. Tanner
(74) Attorney, Agent, or Firm—James M. Ritchey

(57) ABSTRACT

An energy saving apparatus for use with a heat exchange system having a cooled chamber, a compressor, a condenser, an evaporator, an evaporator fan, and refrigerant within refrigerant carrying lines has an evaporator fan controller for monitoring operational status of the system (cooling or non-cooling) and setting an energy saving operational speed for the evaporator fan based on the operational status of the system (cooling or non-cooling) and a current sensor coupled to the evaporator fan controller for detecting the operational status of the system (cooling or non-cooling). If the system is detected as cooling, the evaporator fan controller directs the evaporator fan to operate at a high speed and if the system is detected as not cooling (non-cooling), the evaporator fan controller decreases the operational speed of the evaporator fan to a low speed, thereby decreasing evaporator fan produced heat, resulting in an overall decreased energy requirement for the heat exchange system.

20 Claims, 5 Drawing Sheets

ENERGY SAVING DEVICE FOR WALK-IN REFRIGERATORS AND FREEZERS

BACKGROUND OF THE INVENTION

1. Field of the Invention

An evaporator fan controller is provided to lower energy use in a heat exchange system. More specifically, an evaporator fan controller, for initial installation or retrofit, monitors the cooling cycle of a refrigeration system and adjusts the operation of an associate fan to maximize energy efficiency.

2. Description of the Background Art

Compressor-associated refrigeration systems function by removing heat from a desired location, thereby cooling that location. For example, in a walk-in type refrigerator, often, more than 30% of the heat found in the location to be cooled is actually generated by fan motors within the refrigeration system itself. A typical walk-in refrigerator may have an evaporator coil fitted with five motors of standard configuration. If these motors are rated at a typical value of 1/20 hp each, their combined heat output would be approximately 11,675 Btu/hr, at normal operating voltage. Clearly, if this amount of system generated heat could be reduced or minimized the efficiency of the overall cooling process would be enhanced and the refrigeration system would be less costly to operate.

Disclosed in U.S. Pat. No. 5,488,835 is a control mechanism for a refrigeration unit. The control mechanism utilizes thermostatic sensors to detect the temperature drop across an expansion valve in the refrigeration system (one sensor on each side of the expansion valve). Based on the detected temperature drop, the control mechanism then runs the evaporator fans at either a high or low speed. The drawback to this system is the inherent delay in the change in temperatures associated with the expansion valve.

A device for energy conservation in refrigeration chambers is presented in U.S. Pat. No. 5,797,276 (a continuation of '835 cited above). This device merely claims the addition of a triac switch connected to a transformer in the '835 system and discloses the same fan activation system based on the state of a thermostatic switch within the refrigerated chamber, a scheme not employed in the subject device.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide an evaporator fan controller that monitors the cooling/non-cooling status of a refrigeration system as a function of detected electrical current and then adjusts the speed of an evaporator fan to an appropriate level to save energy.

Another object of the present invention is to supply an evaporator fan controller that, based on selected electrical current flow within the controlled refrigeration system, lowers the necessary energy required to operate the refrigeration system by adjusting the fan or fans associated with the evaporator coils to a lower speed when the system is in non-cooling mode and a higher speed or range of speeds when the system is in cooling mode.

A further object of the present invention is to disclose an evaporator fan controller that monitors the cooling/non-cooling status of a refrigeration system and utilizes the information collected to regulate the evaporator fan speed.

Still another object of the present invention is to relate a method of modifying a new or existing refrigeration system to produce less heat within a chamber being cooled by the system by following the cooling/non-cooling status of the refrigeration system and regulating the evaporator fan speed appropriately.

Disclosed is an evaporator fan controller that lowers energy use in a heat exchange system. The heat exchange system is usually either a walk-in freezer or a walk-in refrigerator, but may extend to other equivalent systems. Such heat exchange systems are comprised of: a cooled chamber; a compressor, generally outside the cooled chamber; a condenser, outside the cooled chamber; an evaporator, inside the cooled chamber; an evaporator fan or fans, inside the cooled chamber; and refrigerant within refrigerant carrying lines that cycle the refrigerant to the various components in the system. Also, frequently included in the refrigeration system is a solenoid that regulates the flow of refrigerant into the coils of the evaporator. Generally, the subject apparatus is an energy saving apparatus having an evaporator fan control means for monitoring a cooling/non-cooling status of the system (this is usually indicated by the on/off status of the compressor, or the solenoid), whereby the control means sets an energy saving operational speed for the evaporator fan based on the system cooling or not cooling. To accomplish this energy saving setting, a current sensor means is included. The current sensor means is coupled to the evaporator fan controller and detects a critical current in the system that indicates if the system is cooling or not cooling (again, typically, the on/off status of the compressor or the solenoid can indicate this cooling/non-cooling status). Thus, if the cooling system is detected as on, the evaporator fan controller directs the evaporator fan to operate at a high speed (a normal operational speed or speeds that would exist without the addition of the subject invention) and if the cooling system is detected as off, the evaporator fan controller means decreases the operational speed of the evaporator fan to a low speed, thereby decreasing evaporator fan produced heat, resulting in an overall decreased energy requirement for the heat exchange system.

Further comprising the subject apparatus is air flow monitor means coupled to the evaporator fan control means, whereby if the air flow over the evaporator falls below a preset value (the decrease in air flow over the evaporator coils may be indicative of icing of the coils or obstruction by dust or dirt) the evaporator fan control means directs the evaporator fan to operate at the high speed to prevent undesirable icing of the evaporator coils.

Additionally, the subject system usually comprises a fail-safe bypass relay means coupled to the evaporator fan control means. If a power failure occurs to the energy saving apparatus the evaporator fan is directed to operate at the high speed to prevent unwanted icing of the evaporator coils in the cooled chamber.

Other objects, advantages, and novel features of the present invention will become apparent from the detailed description that follows, when considered in conjunction with the associated drawings.

DESCRIPTION OF THE PREFERRED EMBODIMENT

Referring now to the included figures and the following description, there is shown a preferred embodiment of an evaporator fan controller that lowers energy use in a heat exchange system. Typically, the heat exchange system comprises a cooled chamber, a compressor, a condenser, an evaporator, an evaporator fan or fans, and refrigerant within refrigerant carrying lines that cycle the refrigerant to the various components in the system. Also, frequently found in the refrigeration system is a solenoid that regulates the flow of refrigerant into the coils of the evaporator. The subject energy saving apparatus comprises an evaporator fan controller for monitoring the cooling/non-cooling status of the system (in many cases the on/off status of the compressor reflects the cooling/non-cooling status of the system, however, some systems with a refrigerant reservoir can go into a cooling mode without the compressor actually being on, but current to a refrigerant gating solenoid will still be present in the cooling mode even if the compressor is off) and sets an energy saving operational speed for the evaporator fan(s) based on the on/off status of the system. In a system in which compressor operational status (on/off) indicates cooling or not cooling, respectively, a current sensor is coupled to the evaporator fan controller for detecting the on/off status of the compressor. If the compressor is detected as on, the subject evaporator fan controller permits the evaporator fan(s) to operate at a normal speed (or fast, relative to the a slower, more energy efficient second speed) and if the compressor is detected as off, the subject evaporator fan controller decreases the operational speed of the evaporator fan(s) to a second speed (slower than the normal speed), thereby decreasing evaporator fan produced heat within the cooled chamber, resulting in an overall decreased energy requirement for the heat exchange system. For a system where cooling/non-cooling status is monitored, the current sensor comprises a current sensor coil coupled to the refrigeration system at a point to determine the operational status of the refrigeration system (cooling or not cooling). One such coupling point is at a solenoid which gates the refrigerant flow into the evaporator coils. When the current sensor coil detects electrical current within the solenoid, the subject system switches the evaporator fan(s) to the normal high speed operational mode. An air flow monitor is coupled to the evaporator fan controller. If the air flow over the evaporator falls below a preset value the evaporator fan controller directs the evaporator fan(s) to operate at the normal higher speed. As a fail-safe feature, a bypass relay is coupled to the evaporator fan controller. If a power failure occurs to the subject controller the evaporator fan(s) is (are) directed to operate at the normal higher speed.

Figure 4:
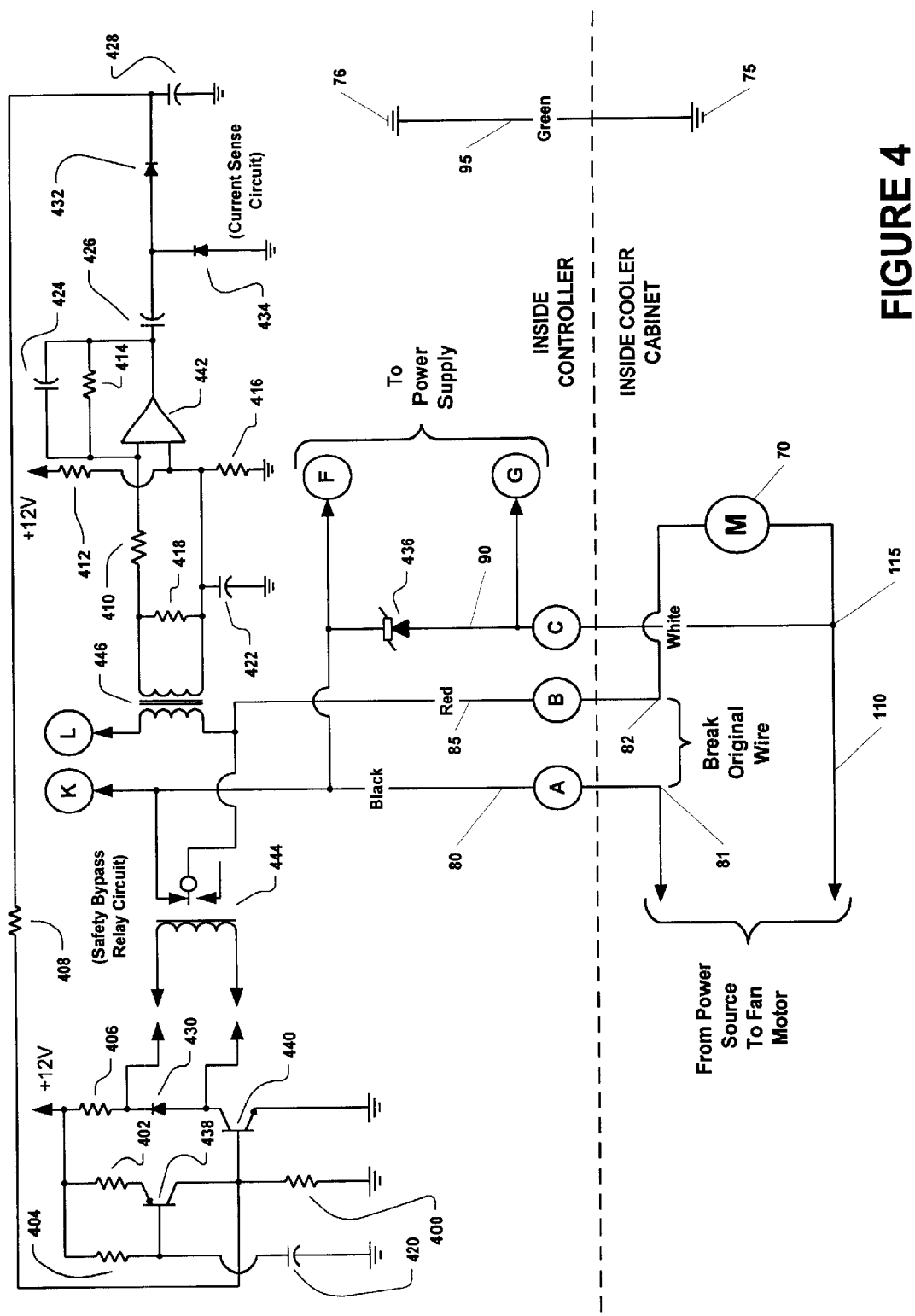
FIG. 4 is a schematic diagram showing an exemplary wiring scheme for a fail-safe bypass relay/current sense circuit of the subject invention.

New or existing refrigeration systems may utilize the subject controller. Modifying an existing refrigeration system is particularly easy and requires only minor alterations for inclusion of the subject invention. The addition of the subject controller and associated current sensor coil and air flow switch/sensor is a rapid process that only requires tapping into the evaporator motor(s) wiring (as seen in FIGS. 2 and 4) and installing the current sensor coil and the air flow sensor/switch at appropriate locations inside the cooled chamber, with their wiring also tied to the subject controller.

Figure 1:
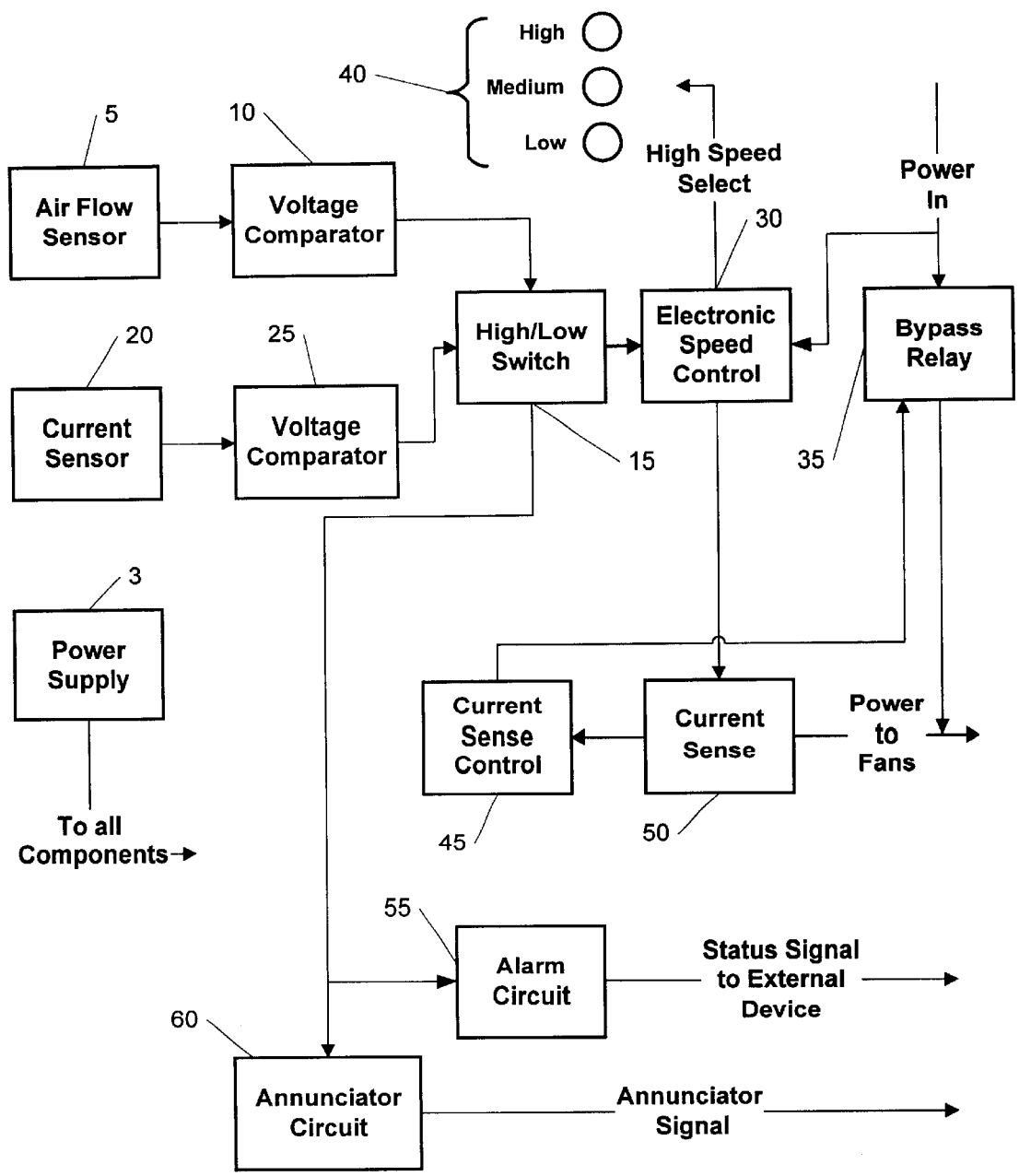
FIG. 1 is a block diagram depicting the subject invention.

Disclosed in FIG. 1 is flow diagram showing elements of the subject system. A power supply 3 provides power to all the components of the system. Usually, two sensors are installed in the cooled chamber that are utilized in the subject device: an air flow sensor/switch 5 and a current sensor 20. A standard air flow sensor or switch 5 is utilized to measure the movement of air over the evaporator coils. Should frost occur or excessive dust or dirt be present on the coils the air flow may drop below levels sufficient to prevent evaporator coil icing, especially if the subject controller slows the evaporator fan(s) because the cooling system is off. Electronic speed control 30 is driven by high/low switch 15, which is controlled by voltage comparator 10, attached to the air flow sensor 5. High/low switch 15 is also coupled via a second voltage comparator 25 to the current sensor 20. The current sensor 20 and voltage comparator 25 detect whether the cooling system is operating or is off. In one instance, the current sensor 20 monitors the current flowing in a solenoid that gates refrigerant to the evaporator coils in the refrigeration system (a preferred current sensor 20 is described in more detail below). The output of the high/low switch 15 is sent to both the electronic speed control 30 for the evaporator fan(s) and to an annunciator circuit 60 and an alarm circuit 55 for producing an annunciator signal and a status signal to an external device, respectively. The electronic fan speed control 30 switches the fan(s) speed to the high/normal range, usually comprising, though not required, high/medium/low settings 40 when the cooling system is operating, or selects the slow or more energy efficient speed when the cooling system is not operating. As a fail-safe means, should power to the subject system be disrupted, a bypass relay 35, coupled to means for monitoring fan motor current by means of current sense 50 and a current sense control unit 45, are included to power the evaporator fan(s) at the high/normal operating speed to prevent icing of the evaporator coils.

WORKING EXAMPLE

Figure 2:
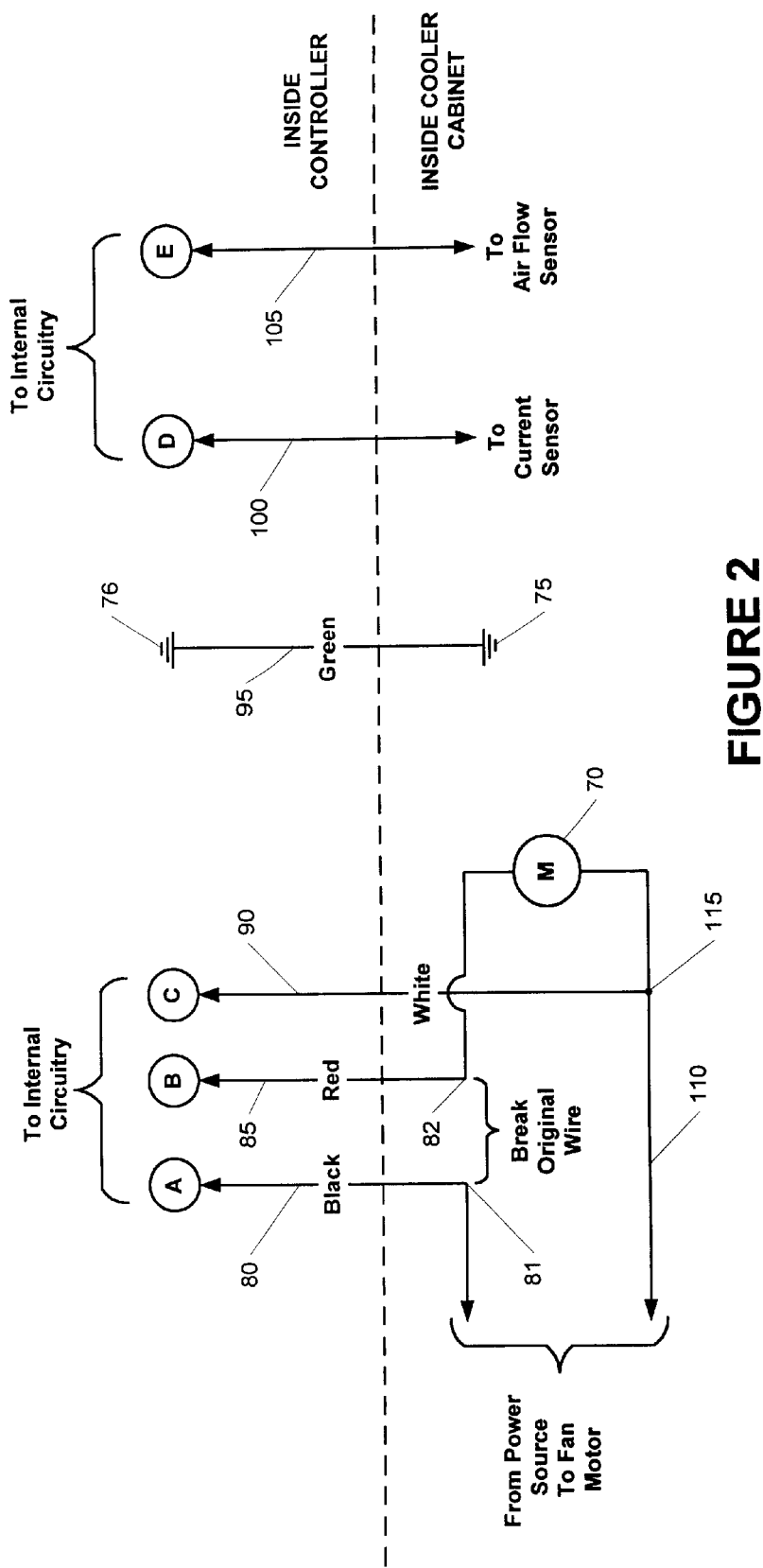
FIG. 2 is a schematic diagram indicating the general electrical connections between the elements inside cooler cabinet and the components inside the subject controller.

By way of example and not by way of limitation, a working example of the subject invention is now related in FIGS. 2–7. The various exemplary components and values, if applicable to a component, are all listed in the included tables (TABLES 1–3) with each functioning in its own customary manner. Shown in FIG. 2 (and associated TABLE 1) are the typical connections between the subject controller and the refrigeration system (it must be remembered that equivalent connections are also considered to be within the realm of this disclosure). The top portion of FIG. 2 illustrates connections inside the controller, while the lower portion of FIG. 2 depicts connections inside the chamber/cabinet which contains the evaporator coils and fans. The evaporator fan motor 70 is adapted to have the controller coupled into its power supply by breaking an original wire between points 81 and 82 and adding wires 80, 85, and 90 that run to the internal controller circuitry at locations A, B, and C. A common grounding system is seen with wire 95 extending between an inside cooler cabinet ground 75 and a controller ground 76. Connections between the inside cooler cabinet current sensor and air flow sensor are seen with wires 100 and 105 and controller circuitry connection locations D and E.

TABLE 1

FIG. 2 Identifiers, Components, and Values

| Identifier | Components, and Values (if applicable) |
|---|---|
| 70 | Evaporator Fan Motor |
| 75 | External Protective Ground |
| 76 | Internal Case Ground |
| 80 | Controller Power Input (hot wire) |
| 81 | Connection to Power Source |
| 82 | Connection to Evaporator Fan Motor |
| 85 | Output Power from Controller (controlled power) |
| 90 | Controller Power Input (neutral wire) |
| 95 | Wire Connection Between Internal and External Protective Ground |
| 100 | Wire from Controller to Current Sensor |
| 105 | Wire from Controller to Air Flow Sensor |
| 110 | Neutral Wire from Power Source |
| 115 | Connection of Neutral Wire to Controller and Evaporator Fan Motor |

Figure 3:
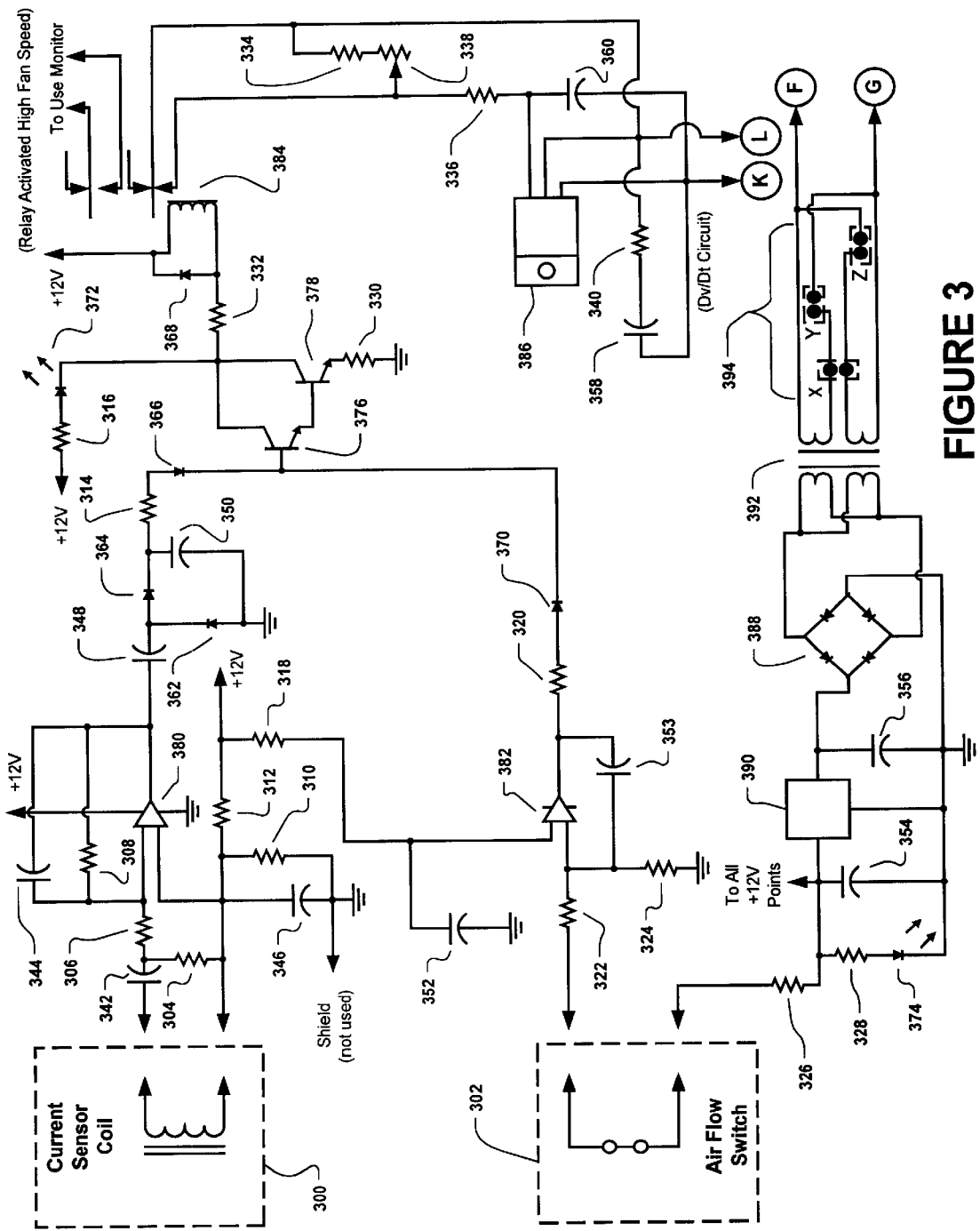
FIG. 3 is a schematic diagram showing an exemplary wiring scheme for the current sensor and air flow sensor portions of the subject invention.
Figure 6:
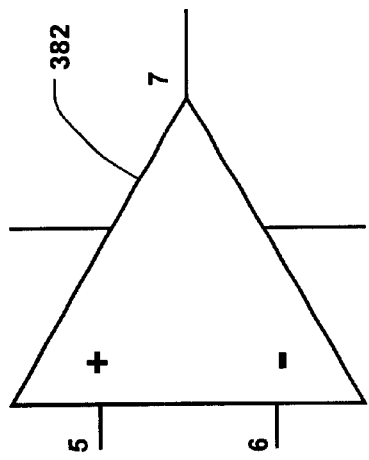
FIG. 6 is a detailed view of operational amplifier 382 found in the schematic shown in FIG. 3.
Figure 5:
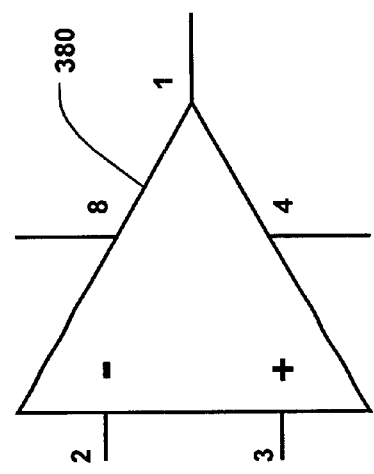
FIG. 5 is a detailed view of operational amplifier 380 found in the schematic shown in FIG. 3.

FIG. 3 (and associated TABLE 2) shows the subject current sensor 300 and air flow 302 sensors/switches and exemplary controller circuitry. Also, it is noted that FIGS. 5 and 6 show specific configurational details of the two exemplary operational amplifiers 380 and 382 depicted in FIG. 3. The operation of the various components to monitor the system operational status-indicating current sensor and the air flow sensor would be clear to those skilled in the relevant arts.

TABLE 2

FIGS. 3, 5, and 6 Identifiers, Components, and Values

| Identifier | Component and Value (if applicable) |
|---|---|
| 300 | Current Sensor Coil (see body of the disclosure for details of this "two-winding" transformer) |
| 302 | Air Flow Switch (a Granger 4RC76) |
| 304 | Resistor: 1kΩ |
| 306 | Resistor: 1kΩ |
| 308 | Resistor: 10kΩ |
| 310 | Resistor: 22kΩ |
| 312 | Resistor: 22kΩ |
| 314 | Resistor: 10kΩ |
| 316 | Resistor: 2.2kΩ |
| 318 | Resistor: 10kΩ |
| 320 | Resistor: 10kΩ |
| 322 | Resistor: 1kΩ |
| 324 | Resistor: 12kΩ |
| 326 | Resistor: 1kΩ |
| 328 | Resistor: 2.2kΩ |
| 330 | Resistor: 10Ω |
| 332 | Resistor: 100Ω |
| 334 | Resistor: 47kΩ |
| 336 | Resistor: 4.7kΩ |
| 338 | Variable Resistor: 200kΩ |
| 340 | Resistor: 100Ω |
| 342 | Capacitor: 1 μF |
| 344 | Capacitor: 0.01 μF |
| 346 | Capacitor: 10 μF |
| 348 | Capacitor: 10 μF |
| 350 | Capacitor: 100 μF |
| 352 | Capacitor: 10 μF |
| 363 | Capacitor: 0.1 μF |
| 354 | Capacitor: 10 μF |
| 356 | Capacitor: 2200 μF, 50 V |
| 358 | Capacitor: 0.1 μF, 250 V |
| 360 | Capacitor: 0.1 μF, 250 V |
| 362 | Diode: 1N914 |
| 364 | Diode: 1N914 |

TABLE 2-continued

FIGS. 3, 5, and 6 Identifiers, Components, and Values

| Identifier | Component and Value (if applicable) |
|---|---|
| 366 | Diode: 1N914 |
| 368 | Diode: 1N914 |
| 370 | Diode: 1N914 |
| 372 | LED: Green "High Speed" |
| 374 | LED: Green "Power" |
| 376 | NPN Transistor: 2N3904 |
| 378 | NPN Transistor: 2N3904 |
| 380 | Op Amp: LF353 |
| 382 | Op Amp: LF353 |
| 384 | Relay: DPDT |
| 386 | Teccor: Q4015LT |
| 388 | Bridge: 1A, 50 V |
| 390 | Voltage Regulator: LM-7812, +12 V |
| 392 | Transformer: 14VAC, 1A |
| 394 | Jumpers Y and Z are installed for 110 V operation and X is installed only for 220 V operation. |

The current sensor coil 300 (a specific embodiment of the current sensor 20 seen in FIG. 1) is an electromagnetic pick-up coil comprising a two-winding transformer that is associated with the refrigeration system to which the subject controller is coupled, at a point indicative of the operational status of the system. A functioning embodiment has each winding with an inductance of 13 mH. In a representative installation, one winding is connected in series with the gating solenoid coil and the other winding is connected to the input of the subject controller. The low inductance of the windings insures that there is only a small reduction in the current to drive the gating solenoid and that the gating solenoid still functions properly to regulate refrigerant flow. However, the low inductance passed to the subject controller causes the signal delivered to the subject controller to be an inexact "copy" of the sine-wave power driving the gating solenoid. The amplifier within the subject controller is configured to compensate for this distorted waveform, in order to properly determine when the refrigeration system is operating.

FIG. 4 (and associated TABLE 3) shows details of the exemplary subject controller and connections to the evaporator fan motor 70 (the wires 80, 85, and 90, along with locations A, B, and C, are seen in both general FIG. 2 and detailed FIG. 4). Also, it is noted that FIG. 7 shows specific configurational details of an exemplary operational amplifier 442 depicted in FIG. 4.

TABLE 3

Figure 7:
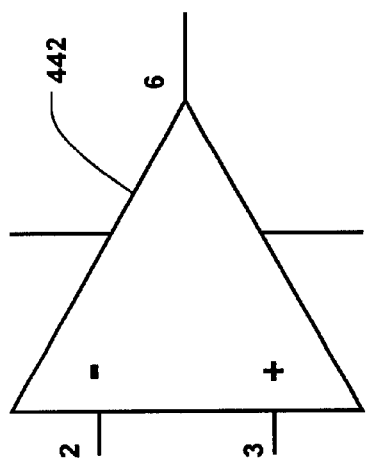
FIG. 7 is a detailed view of operational amplifier 442 found in the schematic shown in FIG. 4.

FIGS. 4 and 7 Identifiers, Components, and Values

| Identifier | Component and Value (if applicable) |
|---|---|
| 70 | Evaporator Fan Motor |
| 75 | External Protective Ground |
| 76 | Internal Case Ground |
| 80 | Controller Power Input (hot wire) |
| 81 | Connection to Power Source |
| 82 | Connection to Evaporator Fan Motor |
| 85 | Output Power from Controller (controlled power) |
| 90 | Controller Power Input (neutral wire) |
| 95 | Wire Connection Between Internal and External Protective Ground |
| 110 | Neutral Wire from Power Source |
| 115 | Connection of Neutral Wire to Controller and Evaporator Fan Motor |
| 400 | Resistor: 2.2kΩ |
| 402 | Resistor: 2.2kΩ |

TABLE 3-continued

FIGS. 4 and 7 Identifiers, Components, and Values

| Identifier | Component and Value (if applicable) |
|---|---|
| 404 | Resistor: 10kΩ |
| 406 | Resistor: 68Ω |
| 408 | Resistor: 4.7kΩ |
| 410 | Resistor: 1kΩ |
| 412 | Resistor: 22kΩ |
| 414 | Resistor: 10kΩ |
| 416 | Resistor: 22kΩ |
| 418 | Resistor: 1kΩ |
| 420 | Capacitor: 100 μF |
| 422 | Capacitor: 10 μF |
| 424 | Capacitor: 0.001F |
| 426 | Capacitor: 10 μF |
| 428 | Capacitor: 100 μF |
| 430 | Diode: 1N914 |
| 432 | Diode: 1N914 |
| 434 | Diode: 1N914 |
| 436 | MOV (metal oxide varistor) |
| 438 | PNP Transistor: 2N3906 |
| 440 | NPN transistor: 2N3904 |
| 442 | Op Amp: LF351, Vcc-7, Gnd-4, 1,5-nc |
| 444 | Relay: SPST, NC |
| 446 | Transformer: Magnetek CSE187L |

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use with a heat exchange system having a cooled chamber, a compressor, a condenser, an evaporator, an evaporator fan, and refrigerant within refrigerant carrying lines, an energy saving apparatus comprising:

a) evaporator fan control means for monitoring cooling/non-cooling status of the heat exchange system and setting an energy saving operational speed for the evaporator fan based on said cooling/non-cooling status and b) current sensor means coupled to said evaporator fan control means for detecting said cooling/non-cooling status of the heat exchange system, whereby if the system is detected as cooling, said evaporator fan control means directs the evaporator fan to operate at a high speed and if said cooling/non-cooling status is detected as non-cooling, said evaporator fan control means decreases the operational speed of the evaporator fan to a low speed, thereby decreasing evaporator fan produced heat, resulting in an overall decreased energy requirement for the heat exchange system.

2. An apparatus according to claim 1, further comprising air flow monitor means coupled to said evaporator fan control means, whereby if air flow over the evaporator falls below a preset value said evaporator fan control means directs the evaporator to operate at said high speed.

3. An apparatus according to claim 1, further comprising fail-safe bypass relay means coupled to said evaporator fan control means, whereby if a power failure occurs to the energy saving apparatus the evaporator fan is directed to operate at said high speed.

4. An apparatus according to claim 1, wherein said current sensor means comprises a current sensor linked to the heat exchange system at a location where current flow reflects said cooling/non-cooling operational status of the system.

5. An apparatus according to claim 4, wherein said current sensor is linked to a solenoid that gates the refrigerant flow into the evaporator.

6. For use with a heat exchange system having a cooled chamber, a compressor outside said cooled chamber, a condenser outside the cooled chamber, an evaporator inside the cooled chamber, an evaporator fan inside the cooled chamber, and refrigerant within refrigerant carrying lines, an energy saving apparatus comprising:

a) an evaporator fan controller for monitoring cooling/non-cooling status of the heat exchange system and setting an energy saving operational speed for the evaporator fan based on said cooling/non-cooling status and b) a current sensor coupled to said evaporator fan controller for detecting said cooling/non-cooling status of the heat exchange system, whereby if the system is detected as cooling, said evaporator fan controller directs the evaporator fan to operate at a high speed and if said cooling/non-cooling status is detected as non-cooling, said evaporator fan controller decreases the operational speed of the evaporator fan to a low speed, thereby decreasing evaporator fan produced heat, resulting in an overall decreased energy requirement for the heat exchange system.

7. An apparatus according to claim 6, further comprising an air flow monitor coupled to said evaporator fan controller, whereby if air flow over the evaporator falls below a preset value said evaporator fan controller directs the evaporator fan to operate at said high speed.

8. An apparatus according to claim 6, further comprising a fail-safe bypass relay means coupled to said evaporator fan controller, whereby if a power failure occurs to the energy saving apparatus the evaporator fan is directed to operate at said high speed.

9. An apparatus according to claim 6, wherein said current sensor is linked to the heat exchange system at a location where current flow reflects said cooling/non-cooling operational status of the system.

10. An apparatus according to claim 6, wherein said current sensor comprises a current sensor coil coupled to a solenoid that gates the refrigerant flow into the evaporator, wherein said current sensor coil detects electrical current within said solenoid reflective of said cooling/non-cooling operational status of the system.

11. A method for saving energy by adapting a heat exchange system with a fan controller apparatus, wherein said heat exchange system has a cooled chamber, a compressor, a condenser, an evaporator, an evaporator fan, and refrigerant within refrigerant carrying lines, comprising the steps:

a) coupling into the heat exchange system an evaporator fan control means for monitoring cooling/non-cooling status of the heat exchange system and setting an energy saving operational speed for the evaporator fan based on said cooling/non-cooling status and b) including a current sensor means coupled to said evaporator fan control means for detecting said cooling/non-cooling status of the heat exchange system, whereby if the system is detected as cooling, said evaporator fan control means directs the evaporator fan to operate at a high speed and if the system is detected as non-cooling, said evaporator fan control means decreases the operational speed of the evaporator fan to a low speed, thereby decreasing evaporator fan produced heat, resulting in an overall decreased energy requirement for the heat exchange system.

12. A method for saving energy according to claim 11, further comprising the step of adapting the heat exchange system with an air flow monitor means coupled to said evaporator fan control means, whereby if air flow over the evaporator falls below a preset value said evaporator fan control means directs the evaporator fan to operate at said high speed.

13. A method for saving energy according to claim 11, further comprising the step of adapting the heat exchange system with a fail-safe bypass relay means coupled to said evaporator fan control means, whereby if a power failure occurs to the energy saving apparatus the evaporator fan is directed to operate at said high speed.

14. A method according to claim 11, wherein said current sensor means comprises a current sensor linked to the heat exchange system at a location where current flow reflects said cooling/non-cooling operational status of the system.

15. A method for saving energy according to claim 14, wherein said current sensor is linked to a solenoid that gates the refrigerant flow into the evaporator.

16. A method for saving energy by retrofitting an existing heat exchange system with a fan controller apparatus, wherein said heat exchange system has a cooled chamber, a compressor, a condenser, an evaporator, an evaporator fan, and refrigerant within refrigerant carrying lines, comprising the steps:
   a) coupling into the heat exchange system an evaporator fan controller for monitoring cooling/non-cooling status of the heat exchange system and setting an energy saving operational speed for the evaporator fan based on said cooling/non-cooling status and
   b) including a current sensor means coupled to said evaporator fan controller for detecting said cooling/non-cooling status of the heat exchange system, whereby if the system is detected as cooling, said evaporator fan controller directs the evaporator fan to operate at a high speed and if the system is detected as non-cooling, said evaporator fan controller decreases the operational speed of the evaporator fan to a low speed, thereby decreasing evaporator fan produced heat, resulting in an overall decreased energy requirement for the heat exchange system.

17. A method for saving energy according to claim 16, further comprising the step of adapting the existing heat exchange system with an air flow monitor means coupled to said evaporator fan controller, whereby if air flow over the evaporator falls below a preset value said evaporator fan controller directs the evaporator fan to operate at said high speed.

18. A method for saving energy according to claim 16, further comprising the step of adapting the existing heat exchange system with a fail-safe bypass relay means coupled to said evaporator fan controller, whereby if a power failure occurs to the energy saving apparatus the evaporator fan is directed to operate at said high speed.

19. A method according to claim 16, wherein said current sensor means comprises a current sensor linked to the heat exchange system at a location where current flow reflects said cooling/non-cooling operational status of the system.

20. A method for saving energy according to claim 16, wherein said current sensor means comprises a current sensor linked to a solenoid that gates the refrigerant flow into the evaporator.

* * * * *